US012657169B2

(12) United States Patent
Hoang et al.

(10) Patent No.: US 12,657,169 B2
(45) Date of Patent: Jun. 16, 2026

(54) SCHEMA LINKING-BASED TECHNIQUES TO BOOST TEXT-TO-QUERY ACCURACY OF LARGE LANGUAGE MODELS

(71) Applicant: Oracle International Corporation, Redwood Shores, CA (US)

(72) Inventors: Trung-Dung Hoang, Lausanne (CH); Giulia Carocari, Zurich (CH); Moein Owhadi Kareshk, Burnaby (CA); Hesam Fathi Moghadam, Sunnyvale, CA (US); Rhicheek Patra, Zurich (CH); Sungpack Hong, Palo Alto, CA (US); Hassan Chafi, Zurich (CH)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 18/933,864

(22) Filed: Oct. 31, 2024

(65) Prior Publication Data

US 2025/0291772 A1      Sep. 18, 2025

Related U.S. Application Data

(60) Provisional application No. 63/565,311, filed on Mar. 14, 2024.

(51) Int. Cl.
| | |
|---|---|
| *G06F 16/21* | (2019.01) |
| *G06F 40/40* | (2020.01) |
| *G06N 3/084* | (2023.01) |

(52) U.S. Cl.
CPC ............ *G06F 16/211* (2019.01); *G06F 40/40* (2020.01); *G06N 3/084* (2013.01)

(58) Field of Classification Search
CPC ........ G06F 16/211; G06F 40/40; G06N 3/084
See application file for complete search history.

(56) References Cited

U.S. PATENT DOCUMENTS

| | | | | |
|---|---|---|---|---|
| 10,572,760 B1 * | 2/2020 | Wu | ...................... | G06V 30/224 |
| 2020/0293564 A1 * | 9/2020 | Reh | ......................... | G06N 3/092 |

(Continued)

OTHER PUBLICATIONS

Malkov et al., "Efficient and robust approximate nearest neighbor search using hierarchical navigable small world graphs" IEEE transactions on pattern analysis and machine intelligence, 42(4), 824-836 (2018).

(Continued)

*Primary Examiner* — Tyler J Torgrimson
(74) *Attorney, Agent, or Firm* — Hickman Becker Bingham Ledesma LLP

(57) ABSTRACT

Here is multitask finetuning of natural language (NL) interaction (NLI) to increase semantic accuracy of database statement generation. A computer associates a first natural language request with a correct database statement for a database schema. The correct database statement contains multiple distinct or repeated identifiers. A large language model (LLM) predicts, from the first natural language request and a strict subset of the database schema, multiple predicted identifiers. Finetuning the LLM entails neural backpropagation, into the LLM, of a loss that is based on a comparison of: a) identifiers in the correct database statement to b) the predicted identifiers. After finetuning, the LLM inferentially generates an inferred database statement from a second natural language request, and this statement is accurate even if a new (i.e. previously unseen) database schema is involved.

25 Claims, 5 Drawing Sheets

$$H(P'|P) = -\sum_i P'(i) \, log(P(i))$$

CROSS ENTROPY 250

201 Associate natural language request with database statement for database schema 202 From leafs of parse tree of database statement, determine multiple identifiers 203 LLM accepts linguistic prompt that contains natural language request and strict subset of database schema 204 From natural language request and strict subset of database schema, LLM predicts multiple identifiers 205 Lexically sort identifiers from database statement and separately sort predicted identifiers 206 Perform low rank adaptation (LoRA)

207 Into LLM, backpropagate loss that is based on comparison of identifiers from database statement and predicted identifiers 208 LLM inferentially generates inferred database statement from second natural language request $$Loss(D_{t2q}, D_{sl}) = \sum_{j \in D_{t2q}} H_j(P'|P) + \alpha \sum_{k \in D_{sl}} H_k(P'|P)$$

CROSS ENTROPY 260

(56) References Cited

U.S. PATENT DOCUMENTS

| | | | | |
|---|---|---|---|---|
| 2021/0019374 | A1* | 1/2021 | Donaldson | G06N 3/084 |
| 2021/0279235 | A1* | 9/2021 | He | G06F 40/30 |
| 2022/0012296 | A1* | 1/2022 | Marey | G06N 3/045 |
| 2022/0165048 | A1* | 5/2022 | Ham | G06N 3/045 |
| 2023/0185799 | A1* | 6/2023 | Hoang | G06F 40/30 |
| | | | | 704/2 |
| 2023/0297577 | A1* | 9/2023 | Vo | G06F 40/279 |
| | | | | 707/769 |
| 2025/0045256 | A1 | 2/2025 | Gottlob | |
| 2025/0060944 | A1 | 2/2025 | Radhakrishna | |
| 2025/0094138 | A1 | 3/2025 | Hu | |
| 2025/0165775 | A1 | 5/2025 | Sathianathan | |
| 2025/0190604 | A1 | 6/2025 | Fu | |
| 2025/0217351 | A1 | 7/2025 | Tan | |
| 2025/0258819 | A1 | 8/2025 | Jain | |
| 2025/0272541 | A1 | 8/2025 | Yan | |
| 2025/0307769 | A1* | 10/2025 | Multani | G06Q 30/0631 |

OTHER PUBLICATIONS

"DefogAI, SQLCoder" dowloaded https://defog.ai/blog/open-sourcing-sqlcoder2-7b/ (2022).

Gao et al., "Text- to-sql empowered by large language models: A benchmark evaluation" arXiv preprint arXiv:2308.15363 (2023).

Hu et al., "Lora: Low-rank adaptation of large language models" arXiv preprint arXiv:2106.09685. (2021).

Lewis et al., "Retrieval-augmented generation for knowledge-intensive nlp tasks" Advances in Neural Information Processing Systems, 33, 9459-9474 (2020).

Li et al., "Can llm already serve as a database interface? a big bench for large-scale database grounded text-to-sqls" Advances in Neural Information Processing Systems, 36.(2024).

Li et al., "Enhancing Text2SQL Generation with Syntactic Information and Multi-task Learning". In International Conference on Artificial Neural Networks (pp. 377-388). Cham: Springer Nature Switzerland (Sep. 2023).

OpenAI,"GPT-4" downloaded https://openai.com/research/gpt-4 (2023).

Luo et al. "WizardCoder: Empowering Code Large Language Models with Evol-Instruct." The Twelfth International Conference on.

Zhou et al., " Large language models are human-level prompt engineers" arXiv preprint arXiv:2211.01910 (2022).

Pourreza et al., "Din-sql: Decomposed in-context learning of text-to-sql with self-correction" Advances in Neural Information Processing Systems, 36 (2024).

Rajkumar et al., " Evaluating the text-to-sql capabilities of large language models" arXiv preprint arXiv:2204.00498 (2022).

Reimers et al., "Sentence-bert: Sentence embeddings using siamese bert-networks" arXiv preprint arXiv:1908.10084 (2019).

Wang et al., "Mac-sql: Multi-agent collaboration for text-to-sql" arXiv preprint arXiv:2312.11242 (2023).

Wang et al., "Self-Instruct: Aligning Language Models with Self-Generated Instructions", Proceedings of the 61st Annual Meeting of the Association for Computational Linguistics (vol. 1: Long Papers) 23 pages (May 25, 2023).

Yu et al, "Spider: A large-scale human-labeled dataset for complex and cross- domain semantic parsing and text-to-sql task"arXiv preprint arXiv:1809.08887 (2018).

Li et al., "StarCoder: may the source be with you!" arXiv preprint arXiv:2305.06161 (2023).

Bergmann, "What is fine-tuning" IBM https://www.ibm.com/think/topics/fine-tuning dated Mar. 15, 2024 (11 pages).

* cited by examiner

FIG. 2

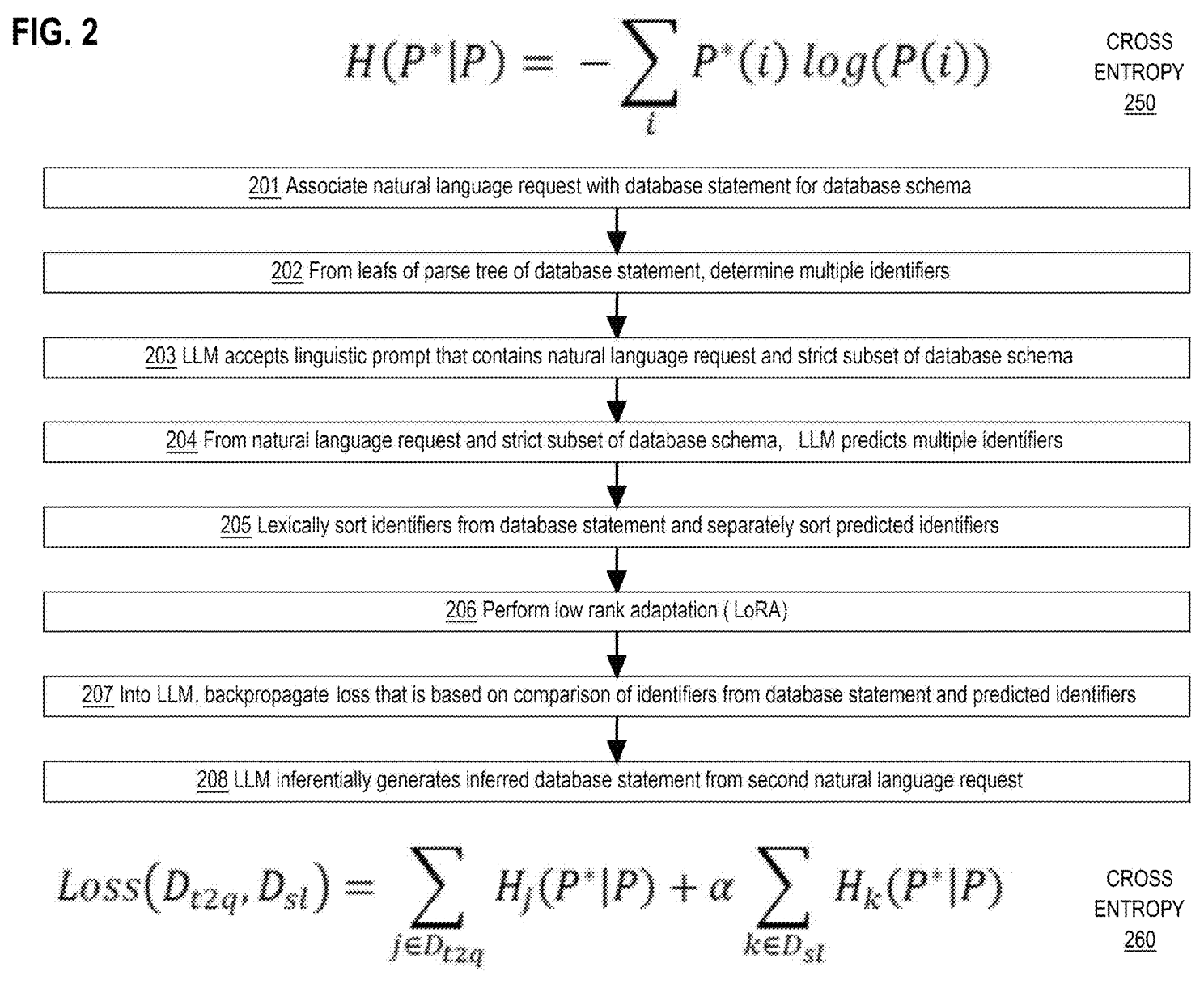

$$H(P^*|P) = -\sum_i P^*(i)\,log(P(i))$$

CROSS ENTROPY 250

201 Associate natural language request with database statement for database schema

→

202 From leafs of parse tree of database statement, determine multiple identifiers

→

203 LLM accepts linguistic prompt that contains natural language request and strict subset of database schema

→

204 From natural language request and strict subset of database schema, LLM predicts multiple identifiers

→

205 Lexically sort identifiers from database statement and separately sort predicted identifiers

→

206 Perform low rank adaptation (LoRA)

→

207 Into LLM, backpropagate loss that is based on comparison of identifiers from database statement and predicted identifiers

→

208 LLM inferentially generates inferred database statement from second natural language request $$Loss(D_{t2q}, D_{st}) = \sum_{j \in D_{t2q}} H_j(P^*|P) + \alpha \sum_{k \in D_{st}} H_k(P^*|P)$$

CROSS ENTROPY 260

FIG. 3

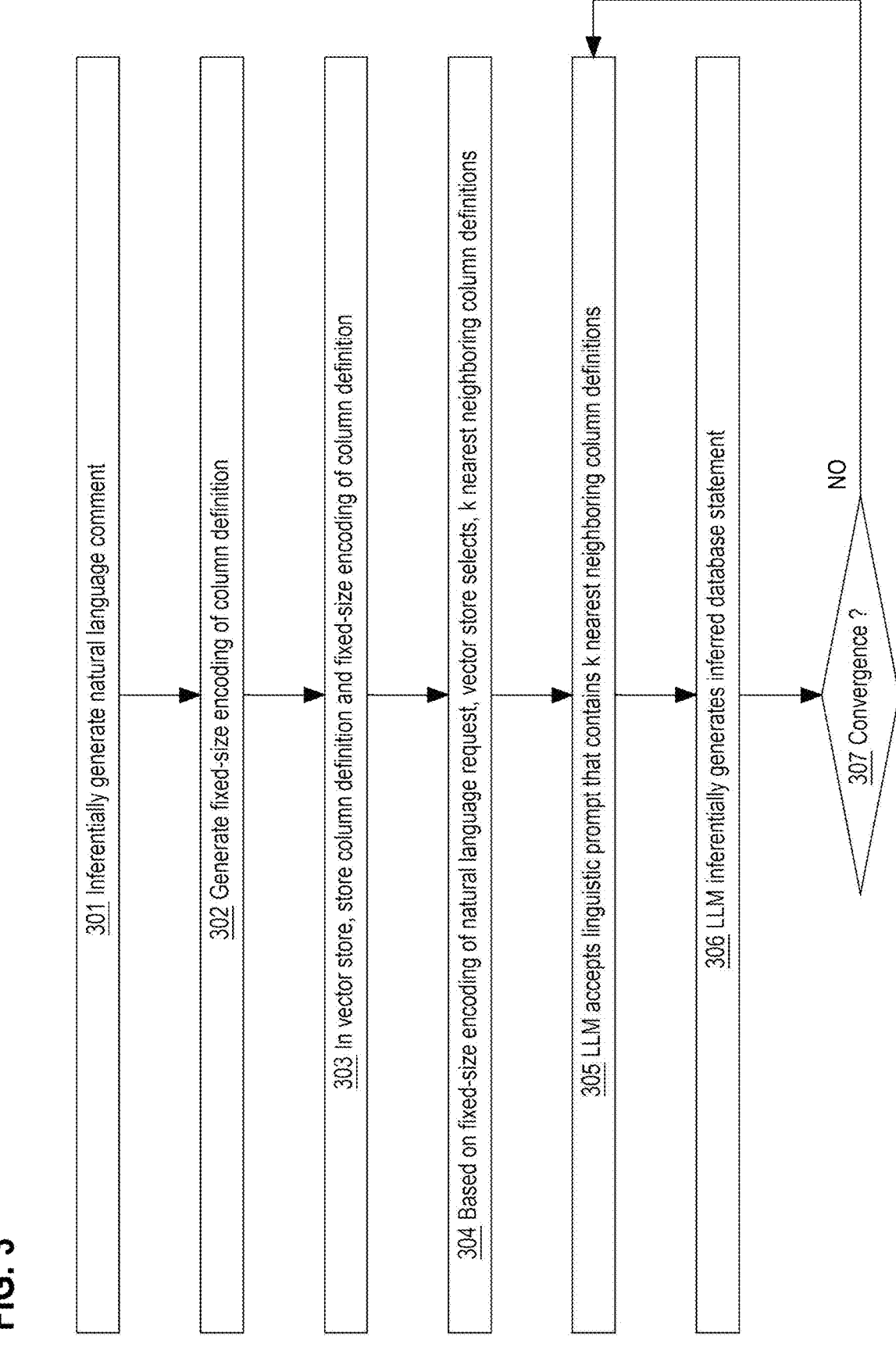

301 Inferentially generate natural language comment

302 Generate fixed-size encoding of column definition

303 In vector store, store column definition and fixed-size encoding of column definition 304 Based on fixed-size encoding of natural language request, vector store selects, k nearest neighboring column definitions 305 LLM accepts linguistic prompt that contains k nearest neighboring column definitions 306 LLM inferentially generates inferred database statement 307 Convergence ?

NO

SCHEMA LINKING-BASED TECHNIQUES TO BOOST TEXT-TO-QUERY ACCURACY OF LARGE LANGUAGE MODELS

BENEFIT CLAIM

This application claims the benefit under 35 U.S.C. § 119(e) of provisional application 63/565,311, filed Mar. 14, 2024, by Trung-Dung Hoang et al., the entire contents of which is hereby incorporated by reference. The applicant hereby rescinds any disclaimer of claim scope in the parent applications or the prosecution history thereof and advise the USPTO that the claims in this application may be broader than any claim in the parent application.

FIELD OF THE DISCLOSURE

The present invention relates to multitask finetuning of natural language interaction (NLI) to increase semantic accuracy of database statement generation.

BACKGROUND

The size of a database schema is not measured in spatial units such as megabytes or gigabytes. Instead, schema size is typically measured as a count of tables, columns, and relationships that are declared in the database schema. Large-scale applications, such as enterprise resource planning (ERP) systems, data warehouses, and e-commerce platforms, often have a complicated schema that declares hundreds of tables and thousands of columns, with intricate relationships between them such as with compound (i.e. multicolumn) keys. For semantic analysis, complexity of a schema may be a greater technologic challenge than sheer size of the schema. The following are design factors that increase a count of tables in a schema. A more complicated data domain has more types of entities and relationships in the data. Additional (e.g. denormalized) tables are added for database acceleration or for distributed storage. These complex schemas are necessary to model intricate business processes and data relationships involved.

Complex data associations such as many-to-many relationships increase schema complexity and, in the case of associative tables, also increase a count of tables. For nested data structures, database schema normalization usually requires hierarchical relationships, such as parent-child relationships, that increase schema complexity. Temporal data may entail duplicative tables for history, staging, and versioning, which may require additional tables and relationships. As a business grows and changes, its data needs may evolve, requiring modifications to a database schema that may, over time, accumulate obsolete (i.e. unused) tables, relationships, and columns. An evolving integration of multiple software applications may entail combining data from multiple sources with different structures and formats that can lead to complex data integration processes and a complicated database schema.

A typical query for online analytical processing (OLAP) or reporting is structurally complex. Applying state of the art machine learned analysis, including natural language processing, to a database query or a database schema may have model accuracy that is decreased due to the complexity of database design and database language as knowledge domains. For example, standard SQL 2023 has 375 reserved keywords and an unlimited amount of unreserved identifiers such as names of tables and columns. A database schema or database statement that is complex provides more opportunities for syntactic errors, semantic errors, and intentional errors.

BRIEF DESCRIPTION OF THE DRAWINGS

In the drawings:

FIG. 2 is a flow diagram that depicts an example computer process that performs multitask finetuning of NLI to increase semantic accuracy of an inferred database statement that is generated by an LLM;

FIG. 3 is a flow diagram that depicts an example retrieval augmented generation (RAG) process that is a runtime process that, in an embodiment, also implements in context learning (ICL) to increase accuracy of an inferred database statement that is iteratively and inferentially generated by an LLM;

DETAILED DESCRIPTION

Figure 1:
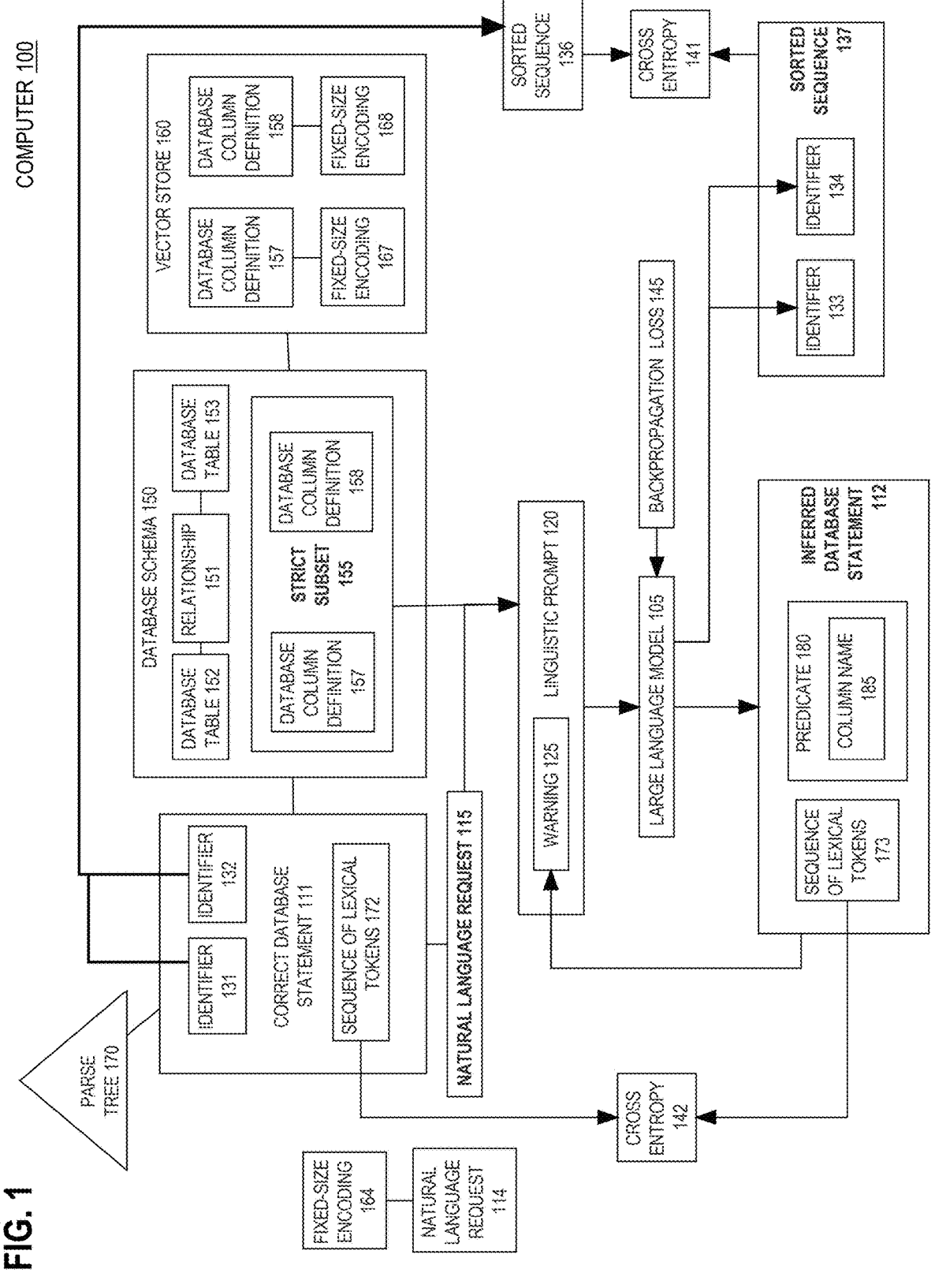
FIG. 1 is a block diagram that depicts an example computer that performs multitask finetuning of natural language (NL) interaction (NLI) to increase semantic accuracy of an inferred database statement that is generated by a large language model (LLM) to fulfil an NL request that may be a natural (e.g. informal) question or a natural command that regards a database that is configured according to a database schema.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Here is multitask finetuning of natural language (NL) interaction (NLI) to increase semantic accuracy of database statement generation. This is an improved way to perform generative NL processing (NLP) for text-to-query as an interactive interface for a database. This approach is based on a generative Large Language Model (LLM). The approach focuses on improving database schema comprehension abilities of the LLM, which are abilities to detect which components of a database schema are required and in what way to generate a valid and correct query given a user's NL question. This approach operates in the following ways.

This approach enriches the LLM's finetuning input data by converting any text-to-query training dataset into a schema linking dataset. The two datasets are jointly used in a multitask framework to finetune the LLM. This increases the volume of training data (but without requiring additional data collection), prevents overfitting due to a mixture of finetuning tasks, and limits the catastrophic forgetting typically exhibited by LLMs after finetuning.

At inference time, this approach dynamically filters part of the schema of the database based on relevance to the given input question. This ensures that a large database schema representation is more likely to fit in the LLM's finite input size as well as to improve query generation performance by providing only the strictly required information to answer the user's question.

This approach applies an iterative, parsing-based refinement to the generated queries, by providing targeted feedback based on the observations made on the parsed query. Herein is supervised finetuning of a pretrained LLM, during which the LLM's internal parameters (i.e. neural connection weights) are adjusted by error backpropagation. Supervised finetuning for text-to-query requires a dataset that contains one or more database schemas of interest, multiple natural language (NL) questions as they would be asked by a human, and the corresponding correct database queries the system is expected to output.

Unlike the state of the art, novel finetuning herein is not prone to overfitting, which is a tendency of an LLM being able to correctly generate examples seen during training, but failing at new examples on unseen database schemas or new questions. Unlike the state of the art, novel finetuning herein does not result in catastrophic forgetting, which is a tendency to make mistakes on inputs that were previously generated correctly by the pretrained LLM.

Herein is multitask finetuning, with schema linking as one semantic finetuning task, and text-to-query as another semantic finetuning task. The database schema and the inferentially generated query will depend on a specific database type (relational, NoSQL, etc.). The text-to-query finetuning task is supervised, and the schema linking finetuning task is self-supervised as follows.

The predefined correct query in a finetuning corpus is parsed by a static (e.g. with no database and no schema) query parser to obtain an abstract syntax tree (AST), which is then matched against a set of formal (i.e. computer interpretable) rules manually defined by developers of the text-to-query system. If any of the predefined rules is found to be violated by a generated query, then this approach repeats query generation with corrective feedback to the LLM in the form of additional text added to an NL input prompt. Herein is query refinement in which the LLM reevaluates the user's NL request by taking this feedback into account, to directly increase accuracy of generated queries.

Query refinement entails a feedback loop that operates in an iterative way until either no more warnings are identified in the generated query, or a predefined amount of iterations or clock duration is reached. This feedback loop has flexibility for futureproofing to readily adapt and extend the corrective capabilities by inclusion of new rules as they are created.

While the primary emphasis is enhancing execution accuracy, this approach can also be employed for database security by introducing semantic rules aimed at detecting potential database vulnerabilities. Semantic rules are heuristics that herein are operated as training guardrails during finetuning and, in an embodiment, the guardrails are retained and installed into a codebase of a DBMS. This installation safeguards the DBMS from potential harm resulting from poorly generated queries. In other words, the semantic rules herein increase the reliability of the database and the database computer.

This approach can detect a standard query language (SQL) injection attack in which a malicious SQL statement is syntactically and, in the state of the art, seems semantically valid. For example, without warning in s state of the art database management system (DBMS) may perform in sequence: 1) a query parser may generate an abstract syntax tree (AST) that is a semantic graph that represents a SQL injection attack; 2) a query planner may generate an execution plan for a SQL injection attack; and 3) the DBMS may fulfill an exfiltration (i.e. data leak) attack by executing the query plan. A semantic rule herein is an innovative way to detect a SQL injection attack.

1.0 Example Computer and Generative Large Language Model (LLM)

FIG. 1 is a block diagram that depicts an example computer 100 that performs multitask finetuning of natural language (NL) interaction (NLI) to increase semantic accuracy of inferred database statement 112 that is generated by large language model (LLM) 105 to fulfil NL request 115 that may be a natural (e.g. informal) question or a natural command that regards database schema 150 or regards a database that is configured according to database schema 150. Computer 100 may be one or more of a rack server such as a blade, a mainframe, or a virtual computer. All of the components shown in FIG. 1 may be stored and operated in volatile or nonvolatile storage of computer 100.

After finetuning of LLM 105 discussed below, LLM 105 can generate inferred database statement 112 that, if executed, should accurately fulfill NL request 115. In various embodiments, computer 100 contains none, some, or all of: a database, a database server, and a DBMS. Thus, whether or not computer 100 can execute inferred database statement 112 depends on the embodiment. In various examples, database statements 111-112 may be expressed in a domain specific language (DSL) such as data query language (DQL), data manipulation language (DML), or data control language (DCL) that all are complementary dialects of SQL.

LLM 105 is a machine learning model that is an artificial neural network that contains at least one NL processing (NLP) transformer (not shown) that has parallel attention, which is unlike a recurrent neural network that is serial. In various embodiments, a transformer may be a unidirectional transformer such as a generalized pretrained transformer (GPT) or a bidirectional encoder representations from transformers (BERT). In operation, LLM 105 accepts linguistic prompt 120 as input, which causes LLM 105 to inferentially generate inferred database statement 112. The lifecycle of LLM 105 is as follows.

1.1 Finetuning after Pretraining that Already Occurred

LLM 105 already was pretrained on computer 100 or another computer. Pretraining is extremely computer resource intensive and consumes much computation time (i.e. processor cycles), much computer storage space for a huge training corpus, and these consume much electricity. Pretraining caused LLM 105 to be accurate at general purpose tasks but not for special (i.e. application specific) tasks.

Finetuning uses an application specific finetuning corpus that is multiple orders of magnitude smaller than the pretraining corpus. However, finetuning still is very computer resource intensive because a transformer may have hundreds of millions of neural connection weights that may be individually adjusted by finetuning, which would take many hours of computation. For example, electricity consumption of BERT finetuning is measured in kilowatt hours.

1.2 Multitask Finetuning has Two Semantic Tasks

Herein, multitask finetuning entails two distinct finetuning tasks that are a schema comprehension task and a text-to-SQL task. Each of both finetuning tasks entails in sequence: 1) generating a task-specific distinct instance of linguistic prompt 120, 2) LLM 105 accepting linguistic prompt 120 as input, 3) LLM 105 responsively inferentially generating a task-specific output, and 4) measuring a task-specific loss for the task-specific output. In that way, each individual invocation of LLM 105 performs one finetuning task or the other but not both tasks. Demonstrating both finetuning tasks requires at least two separate invocations of LLM 105.

Herein, a task-specific component is a component that is not shared by both finetuning tasks, and each of both finetuning tasks has its own respective instance of the task-specific component that may be distinct in structure but similar in function (i.e. purpose) as discussed later herein. For example, components 112 and 137 are shown bold to indicate that components 112 and 137 are respective task-specific outputs of respective finetuning tasks. Inferred database statement 112 is the task-specific output of the text-to-SQL task, and sorted sequence 137 is the task-specific output of the schema comprehension task.

1.3 Text-to-SQL is Generative Task

Text-to-SQL entails LLM 105 inferentially generating inferred database statement 112. Herein, text-to-SQL is also referred to as text-to-query and natural language (NL)-to-SQL. Text-to-SQL is not NL generation (NLG) because a database statement is not NL.

1.4 Schema Linking Entails Schema Comprehension that is Analytic, not Generative Schema linking, also referred to herein as schema comprehension, entails LLM 105 inferentially generating multiple distinct identifiers (i.e. names) 133-134 that each identifies a distinct respective database element whose definition is in database schema 150 such as a database column in a database table. If computer 100 contains a database then, in an embodiment, the database may contain or be defined by database schema 150. In various embodiments, database schema 150 is expressed as data definition language (DDL) for SQL or as a semi-structured document such as JavaScript object notation (JSON) or extensible markup language (XML). In an embodiment, database schema 150 is a database dictionary that contains definition metadata defining database objects as discussed later herein. In an embodiment, the database dictionary contains intended usage information discussed later herein.

1.5 Two Task Specific Cross Entropies

Cross entropies 141-142 are task-specific losses for task-specific outputs respectively of the schema comprehension task and the text-to-SQL task. Informally, herein cross entropy measures (i.e. quantifies), a difference between a predicted sequence and a correct sequence. In other words, cross entropy compares two sequences. Zero cross entropy indicates both sequences are identical. Cross entropies 141-142 are nonnegative numbers.

Cross entropy 142 is a dissimilarity measurement that entails a comparison of sequences of lexical tokens 172-173 as follows. Each of both of database statements 111-112 is tokenized (i.e. logically decomposed) into respective sequence of lexical tokens 172-173 that each contains multiple lexical tokens. A lexical token is a text string that does not contain separator characters such as whitespace. Either or both of sequences of lexical tokens 172-173 may contain duplicate (i.e. multiple occurrences of) lexical tokens. Factors that increase cross entropy 142 include: a) a difference in lengths (i.e. counts of lexical tokens) of sequences of lexical tokens 172-173 such as too many or too few lexical tokens in inferred sequence of lexical tokens 173, b) reordering of lexical tokens between sequences of lexical tokens 172-173, and c) substitution of lexical tokens between sequences of lexical tokens 172-173 such as when sequences of lexical tokens 172-173 have a same length but distinct counts of a particular lexical token.

Cross entropy 141 is measured as follows. Each of identifiers 131-134 is a text string that: a) uniquely identifies a respective database schema element such as a database column, b) can be decomposed into a sequence of one or more lexical tokens and c) may be a fully qualified name that is a concatenation in sequence of: a table name of a database table, a reserved few-character string such as one period character, and a column name of a database column in the database table. Each table name and each fully qualified column name is unique for database schema 150. Depending on the embodiment: a) database schema 150 expressly contains fully qualified column names, or b) LLM 105 infers fully qualified column names from database schema 150.

A parser may parse correct database statement 111 to generate parse tree 170 that may be an abstract syntax tree (AST) that is a semantic graph. In an embodiment, only leafs (i.e. leaves) of parse tree 170 contain substrings (i.e. lexical tokens) that occur in correct database statement 111 such as literals, identifiers, keywords, and punctuation. Identifiers 131-132 each is extracted from a distinct respective leaf as discussed later herein.

Sorted sequence 137 is a sequence of multiple distinct identifiers 133-134. Each of identifiers 131-132 is a fully qualified column name that may be implemented and processed as a sequence of lexical tokens after tokenization of the fully qualified identifier. Likewise, each of identifiers 133-134 may be a fully qualified identifier that is implemented and processed as a sequence of lexical tokens. In that case, cross entropies 141-142 are measured in a same way. In an accelerated embodiment, cross entropy 141 is measured by comparing sorted sequences 136-137 without tokenization. Sorted sequences 136-137 are lexically (e.g. alphanumerically) sorted by computer 100.

1.6 Neural Backpropagation of Entropies of Different Tasks

Backpropagation loss 145 is a weighted sum of cross entropies 141-142. Neural backpropagation of backpropagation loss 145 into LLM 105 increases accuracy of LLM 105. Here, accuracy means low cross entropy, with zero being perfect accuracy. Measurements 141-142 and 145 are inaccuracy measurements for one inference by LLM 105, and other inferences by LLM 105 have their own separate measurements 141-142 and 145. In an embodiment: a) a finetuning minibatch also has its own separate measurements 141-142 and 145 that are averages of those respective measurements over all inferences for the minibatch, and b) only backpropagation loss 145 of the minibatch is backpropagated into LLM 105.

Cross entropy 142 measures syntactic and semantic inaccuracy. Cross entropy 141 measures only semantic accuracy. For a custom combination of cross entropies 141-142, backpropagation loss 142 may be a linear (i.e. weighted) combination of cross entropies 141-142 having one or two weights (i.e. coefficients, not shown), referred to herein as entropy weights, that are for example, adjustable, tunable, optimizable, or trained (i.e. learned).

1.7 Example Semantic Rule Applied to Example NL Request

However as follows, backpropagation loss 145 is not the only way to increase the accuracy of LLM 105. Computer 100 may contain and operate semantic rules (not shown) that are handcrafted, not learned, and formally structured for automatic evaluation by computer 100.

In an embodiment, a semantic rule comprises a semantic condition and a predefined result shown as warning 125 that is natural language sentence(s). Evaluation of a semantic rule entails dynamically evaluating the semantic condition of the rule, and the condition evaluates to a Boolean (i.e. true or false). As discussed later herein, a semantic rule may be operated as a finetuning guardrail.

In one example, NL request 115 is a question, and NL request 114 is not a question. To demonstrate evaluation of a semantic condition, the following is an example NL request 115 that is a natural question.

> What is the name of the shop that is hiring the largest number of employees?

1.8 Example Query Generated for Example Database Schema

A database statement can be semantically valid for one database schema and semantically invalid for another database schema. To demonstrate evaluation of a semantic condition, the following is an example inferred database statement 112 that might be a semantically invalid way to fulfil the above example NL request 115 with database schema 150.

> SELECT s.Name FROM shop s JOIN hiring h ON s. Shop_ID=h. Shop_ID GROUP BY s.Name ORDER BY COUNT (h.Employee_ID) DESC LIMIT 1;

To demonstrate evaluation of a semantic condition, the following is an example database schema 150 in a JavaScript object notation (JSON) format that computer 100 comprehends and interprets. For example, comprehension of the following example database schema 150 includes semantic comprehension that example database tables shop and hiring are joined by a relationship. In this example, tables shop and hiring may respectively be database tables 152-153. In the following example database schema 150, Foreign_keys declaratively defines relationship 151.

```
Table shop, columns= [
    Shop_ID, Name, Location, District,
    Number_products, Manager_name
]
Table hiring, columns=
    [Shop_ID, Employee_ID, Start_from, Is_full_time]
Primary_keys =[shop .Shop_ID, hiring.Employee_ID]
Foreign_keys = [hiring.Shop_ID = shop.Shop_ID]
```

1.9 in Context Learning (ICL) with Example Warning

A semantic condition effectively performs semantic pattern recognition on inferred database statement 112. For example, a semantic condition may detect whether or not inferred database statement 112 groups by a column that is not unique such as not a key. Detecting that a column is grouped by entails both syntactic and semantic detections by the semantic condition or as learned by LLM 105. A semantic condition works even if database schema 150 is new (i.e. previously unseen or nonexistent) as discussed later herein.

The following is an example warning 125 that LLM 105 comprehends and interprets when warning 125 is contained in linguistic prompt 120. Warning 125 may be the predefined result of a semantic rule, and warning 125 may be dynamically copied from the semantic rule into linguistic prompt 120 such as by prepending or appending. The following example warning 125 contains two different fully qualified column names, but these two names are not both of the column names in the above example Foreign_keys.

> Grouping by shop.Name should be double checked. Two different shop.Shop_ID can have the same shop.Name.

1.10 Example Semantic Warnings and SQL Injection Attack

Additional example semantic warnings include: a) an ambiguity warning that contains a name of a database column that does not have a unique constraint and b) a mutual exclusion warning that contains a name of a database column that is used in either: a) a conjunctive predicate in the inferred database statement that cannot evaluate to true or b) a disjunctive predicate in the inferred database statement that cannot evaluate to false. In an embodiment, a semantic rule having the mutual exclusion warning is used both in finetuning and in a live DBMS with a workload of dynamically received database statements including a mix of inferentially generated statements and statements not inferentially generated. Even if a database statement was not inferentially generated, as soon as parsing the statement generates an abstract syntax tree (AST) that is a semantic graph, then the semantic rule having the mutual exclusion warning can be evaluated on the statement to detect a SQL injection attack. Semantic rules for database security may operate herein before query planning and query optimization and may, for example, cause a database statement to be rejected instead of executed.

When LLM 105 accepts warning 125 in input, in context learning (ICL) occurs, which increases accuracy of LLM 105 without training and without backpropagation loss 145. ICL may occur even if the neural weights in LLM 105 are immutable (i.e. read only).

ICL and neural backpropagation are mutually exclusive (i.e. do not occur in a same lifecycle phase of LLM 105), which means that ICL and neural backpropagation do not cooccur. Neural backpropagation does not occur at runtime. ICL only occurs at runtime. ICL and finetuning also are mutually exclusive and do not cooccur. All of components 111, 133-134, 136-137, 141-142, 145, and 170 are unused (e.g. unavailable) at runtime. Of the components shown in FIG. 1, runtime only uses components 100, 105, 112, 114-115, 120, 125, 150, 160, and 164.

1.11 Retrieval Augmented Generation (RAG) with Vector Store

Discussed later herein is an embodiment that uses vector store 160 for retrieval augmented generation (RAG) to improve time, space, and accuracy of internal operation of computer 100. Without RAG, linguistic prompt 120 contains whole database schema 150 that may be huge. Large-scale software applications, such as enterprise resource planning (ERP) systems, data warehouses, and e-commerce platforms, often have database schemas with hundreds or even thousands of tables. An average number of columns per table in such large software applications typically is between fifteen and thirty columns. For example a count of table columns in database schema 150 may be 1,000 tables times 25 columns per table=25,000 columns. In an embodiment, LLM 105 cannot accept a linguistic prompt that is large enough to contain whole database schema 150.

RAG can cooccur with ICL, finetuning, or neural backpropagation because RAG is complementary (i.e. not mutually exclusive). With RAG, strict subset 155 is a proper subset that consists of some but not all of the database elements defined in database schema 150. Increased speed and accuracy of generation or operation of components 100, 105, and 120 is caused by avoidance of LLM 105 accepting, in linguistic prompt 120, the entirety of database schema 150. In that way, strict subset 155 saves memory by decreasing the size of linguistic prompt 120. RAG using vector store 160 to select strict subset 155 from database schema 150 is discussed later herein.

1.12 Relational Schema of Database

Database schema 150 contains definitions of database elements 151-153 and 157-158. For example, database tables 152-153 may be definitions of relational tables, and relationship 151 may be a definition of an association between database tables 152-153.

In an embodiment, strict subset 155 consists of or contains multiple database column definitions 157-158 that each defines a distinct database column in either of database tables 152-153. In one example: a) database column definition 157 defines a primary key column in database table 152, b) database column definition 158 defines a foreign key column in database table 153, and c) relationship 151 contains identifiers of database column definitions 157-158.

Most of the database columns defined in database schema 150 are not in strict subset 155. Vector store 160 is a key value store that contains values that are all database column definitions defined in database schema 150. For each database column definition in database schema 150, computer 100 inferentially generates a respective distinct fixed-size encoding that is a numeric array that represents the variable-size database column definition. Discussed later herein are generation and use of fixed-size encodings 167-168 to increase speed and accuracy of selection of strict subset 155.

As follows, both of RAG and LLM 105 work even if database schema 150 is new (i.e. not in vector store 160). In a preferred embodiment: a) during finetuning, vector store 160 contains database column definitions from multiple deployed databases and b) in production, a separate vector store 160 is dedicated to each individual deployed database, and each vector store 160 is populated only from the database schema of that database. RAG herein is future-proofed after finetuning by populating a new vector store 160 only from a new database schema that the finetuning vector store 160 did not contain.

2.0 Example Finetuning Process

FIG. 2 is a flow diagram that depicts an example process that computer 100 may perform, including multitask finetuning of natural language (NL) interaction (NLI) to increase semantic accuracy of inferred database statement 112 that is generated by large language model (LLM) 105. FIG. 2 also shows cross entropies 250 and 260. Cross entropy 250 is an equation that a reusable numeric subroutine may implement, and that subroutine can be invoked to measure, for a single invocation of LLM 105, either of cross entropies 141-142 in FIG. 1. In cross entropy 250, i is an offset into a sequence being compared.

Cross entropy 260 is an equation that a reusable numeric subroutine may implement, and that subroutine can be invoked to measure backpropagation loss 145 of a minibatch of invocations of LLM 105 or a single invocation of LLM 105 such as when the batch size is one invocation. In cross entropy 260: a) summation of Hj is cross entropy 142 of the minibatch, b) summation of Hk is cross entropy 141 of the minibatch, and c) a (i.e. alpha) is the only entropy weight, as discussed earlier herein.

Finetuning of LLM 105 proceeds as follows. Step 201 prepares a finetuning corpus by associating each predefined NL request with a respective correct predefined database statement for a respective predefined database schema. The finetuning corpus consists of multiple triples that each contains: 1) a predefined NL request, 2) a predefined database schema or an identifier that uniquely identifies such a schema, and 3) a predefined correct database statement that can fulfil the predefined NL request according to the schema. For example, a finetuning triple may consist of data structures 111, 115, and 150.

Step 202 uses a parser to parse correct database statement 111 to generate parse tree 170 (e.g. abstract syntax tree, AST) that represents correct database statement 111. From leafs (i.e. leaves) of parse tree 170, step 202 extracts all of distinct identifiers 131-132 during finetuning of LLM 105, where each leaf contains zero or one identifier that may or may not be repeated in other leafs.

In step 203, LLM 105 accepts linguistic prompt 120 that contains NL request 115 and a strict subset (i.e. not all) of the database elements defined in database schema 150. Increased speed and accuracy of next step 204 is caused by avoidance of LLM 105 accepting the whole of database schema 150 in step 203, which saves memory by decreasing the size of linguistic prompt 120. Retrieval augmented generation (RAG) in step 203 to select the strict subset of database schema 150 is discussed later herein.

From NL request 115 and the strict subset of database schema 150, in step 204, LLM 105 predicts (e.g. unsorted) multiple distinct identifiers 133-134 as discussed earlier herein.

As needed for measuring cross entropy, step 205 lexically sorts identifiers 131-132 from correct database statement 111 and separately sorts predicted identifiers 133-134. That is, step 205 generates sorted sequences 136-137.

LLM 105 is a deep neural network (DNN) that is defined by a weight matrix (not shown) that consists of neural weights (i.e. coefficients). Before the process of FIG. 2, LLM 105 and its weight matrix were already pretrained for general semantics such as general tasks and general topics. Step 206 performs low rank adaptation (LoRA) that treats the weight matrix as immutable (i.e. read only). Instead, LoRA decomposes the pretrained weight matrix into two factor matrices that can be multiplied together to estimate a finetuned weight matrix.

In step 207, LoRA backpropagates backpropagation loss 145 into the two factor matrices instead of the weight matrix. LoRA accelerates finetuning because the two factor matrices together are much smaller than the weight matrix and thus entail less numeric computing. At the end of finetuning, step 207 finetunes the weight matrix by applying the finetuned factor matrices to the weight matrix, and this increases the accuracy of the weight matrix and LLM 105. During or after finetuning, step 208 LLM inferentially generates an inferred database statement from a second natural language request that is different from NL request 115 as discussed later herein.

3.0 Example Activities for in Context Learning (ICL) with Retrieval Augmented Generation (RAG)

Herein, retrieval augmented generation (RAG), if implemented, occurs in each of finetuning and runtime (i.e. after deployment). FIG. 3 is a flow diagram that depicts an example RAG process that is a runtime process that computer 100 may perform including in context learning (ICL) to increase accuracy of inferred database statement 112 that is iteratively and inferentially generated by large language model (LLM) 105. RAG entails a huge semantic space consisting of, for example, tens of thousands of database columns, where each column has its own semantics specified in a respective database column definition. Each database column definition may contain its own declarations such as datatype, name, constraint(s), and descriptive NL comment.

3.1 RAG Construction

The RAG process entails a RAG construction phase followed by a RAG execution phase. RAG construction entails steps 301-303 that occur before generation of linguistic prompt 120 and, at runtime, can occur before generation of NL request 115.

Each of database column definition 157-158 may contain zero or more descriptive (i.e., inoperative) NL comments such as a block comment or a line comment. For example, zero, one, or both of database column definitions 157-158 might be uncommented (i.e. not contain a comment). Step 301 is an optional (e.g. unimplemented) step that uses a second LLM (not shown in FIG. 1) that is an imputer LLM that performs NL generation (NLG) that inferentially imputes, from a database column definition, an NL comment that describes semantics of an uncommented database column definition. Imputed NL comments increase semantic accuracy of all of RAG and components 105, 112, 120, 155, 160, and 167-168.

In an embodiment, the imputer LLM accepts a linguistic prompt (not shown) that contains metadata from the database schema that defines the database column. In an embodiment, the linguistic prompt contains metadata that indicates an intended usage (IU). An IU already is assigned to a database column to (a) indicate how the column is intended to be used, and (b) affect how the database server behaves when database operations involve values from the column. The IU assigned to a database column supplements, but does not replace, the datatype definition for the column. Each IU may have an IU-bundle. The IU-bundle of an IU indicates how the database server behaves with respect to any column that is assigned the IU. For example, the IU-bundle may indicate constraints that the database server must validate during operations on values from columns assigned to the IU. Automation techniques for intended usage are presented in U.S. patent application Ser. No. 18/099,034 EXTENDING DATABASE DATA WITH INTENDED USAGE INFORMATION filed by Tirthankar Lahiri et al on Jan. 19, 2023 that is incorporated in its entirety herein. In an embodiment, some or all of components 120, 155, 157-158, and 160 may contain IU metadata.

In structured query language (SQL) data definition language (DDL), each of database column definitions 157-158 is one or more lines of text that, except for the comment, is not NL. Not shown in FIG. 1 is a third LLM that is an encoder LLM that functions as an encoder that inferentially generates a fixed-size encoding from one or a few lines of text. In an embodiment, the encoder LLM is an already trained instance of SentenceBERT that is based on bidirectional encoder representation transformers (BERT).

From each database column definition in database schema 150, the encoder LLM inferentially generates a respective one of fixed-size encodings 167-168 in step 302. The imputer LLM performs NLG, but the encoder LLM does not. Each of fixed-size encodings 167-168 is a lossy semantic encoding in a latent space of the encoder LLM.

In vector store 160, step 303 populates vector store 160 by storing database column definitions and fixed-size encodings of them in vector store 160. Each of fixed-size encodings 167-168 is a uniform-size array whose elements are real numbers such as coefficients. Each number in a fixed-size encoding may be treated as a value in a distinct respective dimension, in which case each of fixed-size encodings 167-168 is a multidimensional value that is a point in a multidimensional encoding space. Multidimensional distance (e.g. Euclidian, Manhattan, or Mahalonobis) between two fixed-size encodings is a semantic distance that is a dissimilarity measurement that is a scalar number.

Less semantic distance means more similarity between to fixed-size encodings and between the two objects represented by those encodings. The encoder LLM may inferentially generate a fixed-size encoding from either of NL requests 114-115. For example, fixed-size encoding 164 semantically represents NL request 114. A similarity may be measured between fixed-size encodings of one NL request and one database column definition. Multidimensional clustering may be used to generate multiple semantic clusters of database column definitions that are stored in vector store 160 that is a key value store that contains all database column definitions defined in database schema 150 as discussed earlier herein.

3.2 RAG Execution is Dynamic and Fast

There is no limit on how long is a duration between when the RAG construction phase ends and the RAG execution phase begins. Receipt of NL request 115 causes RAG execution that entails steps 304-307 as follows. Based on a fixed-size encoding of NL request 115, vector store 160 dynamically selects multiple column definitions that are k semantically nearest neighbors of NL request 115 in step 304. That is, step 304 dynamically selects k fixed-size encodings that are semantically nearest the fixed-size encoding of NL request 115. For futureproofing, step 304 works even if database schema 150 is new (i.e. previously unseen or nonexistent), so long as the RAG construction phase can be performed just-in-time (i.e. on demand), using only the new database schema 150, when NL request 115 is received before performing step 304.

ICL entails steps 305-307 that are all repeated in each of a sequence of iterations. The first iteration initially generates data structures 112, 120, and 125, and each subsequent iteration regenerates data structures 112, 120, and 125. In that way, accuracy of inferred database statement 112 more or less monotonically increases as discussed below, which means that: a) inferred database statement 112 is monotonically iteratively improved, and b) importance or presence of warning 125 monotonically decreases or eventually ceases. Step 305 generates linguistic prompt 120 as discussed earlier herein, and linguistic prompt 120 contains the k nearest neighboring column definitions that step 304 selected.

3.3 ICL Increases Accuracy and Security

In step 305, LLM 105 accepts linguistic prompt 120 as input. Responsively in step 306, LLM 105 inferentially generates inferred database statement 112, and heuristically selects predefined warning 125 as discussed earlier herein.

Step 307 detects whether or not ICL convergence occurs, which is when a predefined criterion is satisfied. In an embodiment, a maximum count of iterations or a maximum clock duration is a convergence criterion. Herein: a) a criterion that is a maximum evaluates as true when the maximum is less than a current value, and b) a criterion that is a minimum evaluates as true when the minimum is greater than a current value. If convergence is detected, then: a) ICL iteration ceases, b) inferred database statement 112 as generated in the last iteration is executed against a database or returned to the user, and c) the process of FIG. 2 ceases.

If convergence has not yet occurred, the current iteration ceases and a next iteration occurs, shown by the backwards arrow from step 307 back to step 305. The next iteration: a) regenerates linguistic prompt 120 that, unlike in the first iteration, contains warning 125 and b) regenerates (i.e. improves, increases accuracy of) inferred database statement 112.

When a current iteration accepts a linguistic prompt 120 that contains warning 125, inferred database statement 112 of the previous iteration is characterized by warning 125. In an embodiment: a) sequence of lexical tokens 173 of the previous iteration is retained, and b) a convergence criterion of step 307 is a minimum cross entropy between sequences of lexical tokens 173 of the previous and current iterations, where cross entropy is measured in a similar way as cross entropy 142.

4.0 Database System Overview

A database management system (DBMS) manages a database. A DBMS may comprise one or more database servers. A database comprises database data and a database dictionary that are stored on a persistent memory mechanism, such as a set of hard disks. Database data may be stored in one or more collections of records. The data within each record is organized into one or more attributes. In relational DBMSs, the collections are referred to as tables (or data frames), the records are referred to as records, and the attributes are referred to as attributes. In a document DBMS ("DOCS"), a collection of records is a collection of documents, each of which may be a data object marked up in a hierarchical-markup language, such as a JSON object or XML document. The attributes are referred to as JSON fields or XML elements. A relational DBMS may also store hierarchically marked data objects; however, the hierarchically marked data objects are contained in an attribute of record, such as JSON typed attribute.

Users interact with a database server of a DBMS by submitting to the database server commands that cause the database server to perform operations on data stored in a database. A user may be one or more applications running on a client computer that interacts with a database server. Multiple users may also be referred to herein collectively as a user.

A database command may be in the form of a database statement that conforms to a database language. A database language for expressing the database commands is the Structured Query Language (SQL). There are many different versions of SQL; some versions are standard and some proprietary, and there are a variety of extensions. Data definition language ("DDL") commands are issued to a database server to create or configure data objects referred to herein as database objects, such as tables, views, or complex data types. SQL/XML is a common extension of SQL used when manipulating XML data in an object-relational database.

Changes to a database in a DBMS are made using transaction processing. A database transaction is a set of operations that change database data. In a DBMS, a database transaction is initiated in response to a database command requesting a change, such as a DML command requesting an update, insert of a record, or a delete of a record or a CRUD object method invocation requesting to create, update or delete a document. DML commands and DDL specify changes to data, such as INSERT and UPDATE statements. A DML statement or command does not refer to a statement or command that merely queries database data. Committing a transaction refers to making the changes for a transaction permanent.

Under transaction processing, all the changes for a transaction are made atomically. When a transaction is committed, either all changes are committed, or the transaction is rolled back. These changes are recorded in change records, which may include redo records and undo records. Redo records may be used to reapply changes made to a data block. Undo records are used to reverse or undo changes made to a data block by a transaction.

An example of such transactional metadata includes change records that record changes made by transactions to database data. Another example of transactional metadata is embedded transactional metadata stored within the database data, the embedded transactional metadata describing transactions that changed the database data.

Undo records are used to provide transactional consistency by performing operations referred to herein as consistency operations. Each undo record is associated with a logical time. An example of logical time is a system change number (SCN). An SCN may be maintained using a Lamporting mechanism, for example. For data blocks that are read to compute a database command, a DBMS applies the needed undo records to copies of the data blocks to bring the copies to a state consistent with the snap-shot time of the query. The DBMS determines which undo records to apply to a data block based on the respective logical times associated with the undo records.

In a distributed transaction, multiple DBMSs commit a distributed transaction using a two-phase commit approach. Each DBMS executes a local transaction in a branch transaction of the distributed transaction. One DBMS, the coordinating DBMS, is responsible for coordinating the commitment of the transaction on one or more other database systems. The other DBMSs are referred to herein as participating DBMSs.

A two-phase commit involves two phases, the prepare-to-commit phase, and the commit phase. In the prepare-to-commit phase, branch transaction is prepared in each of the participating database systems. When a branch transaction is prepared on a DBMS, the database is in a "prepared state" such that it can guarantee that modifications executed as part of a branch transaction to the database data can be committed. This guarantee may entail storing change records for the branch transaction persistently. A participating DBMS acknowledges when it has completed the prepare-to-commit phase and has entered a prepared state for the respective branch transaction of the participating DBMS.

In the commit phase, the coordinating database system commits the transaction on the coordinating database system and on the participating database systems. Specifically, the coordinating database system sends messages to the participants requesting that the participants commit the modifications specified by the transaction to data on the participating database systems. The participating database systems and the coordinating database system then commit the transaction.

On the other hand, if a participating database system is unable to prepare or the coordinating database system is unable to commit, then at least one of the database systems is unable to make the changes specified by the transaction. In this case, all of the modifications at each of the participants and the coordinating database system are retracted, restoring each database system to its state prior to the changes.

A client may issue a series of requests, such as requests for execution of queries, to a DBMS by establishing a database session. A database session comprises a particular connection established for a client to a database server through which the client may issue a series of requests. A database session process executes within a database session and processes requests issued by the client through the database session. The database session may generate an execution plan for a query issued by the database session client and marshal slave processes for execution of the execution plan.

The database server may maintain session state data about a database session. The session state data reflects the current state of the session and may contain the identity of the user for which the session is established, services used by the user, instances of object types, language and character set data, statistics about resource usage for the session, temporary variable values generated by processes executing software within the session, storage for cursors, variables, and other information.

A database server includes multiple database processes. Database processes run under the control of the database server (i.e., can be created or terminated by the database server) and perform various database server functions. Database processes include processes running within a database session established for a client.

A database process is a unit of execution. A database process can be a computer system process or thread or a user-defined execution context such as a user thread or fiber. Database processes may also include "database server system" processes that provide services and/or perform functions on behalf of the entire database server. Such database server system processes include listeners, garbage collectors, log writers, and recovery processes.

A multi-node database management system is made up of interconnected computing nodes ("nodes"), each running a database server that shares access to the same database. Typically, the nodes are interconnected via a network and share access, in varying degrees, to shared storage, e.g., shared access to a set of disk drives and data blocks stored thereon. The nodes in a multi-node database system may be in the form of a group of computers (e.g., workstations, personal computers) that are interconnected via a network. Alternately, the nodes may be the nodes of a grid, which is composed of nodes in the form of server blades interconnected with other server blades on a rack.

Each node in a multi-node database system hosts a database server. A server, such as a database server, is a combination of integrated software components and an allocation of computational resources, such as memory, a node, and processes on the node for executing the integrated software components on a processor, the combination of the software and computational resources being dedicated to performing a particular function on behalf of one or more clients.

Resources from multiple nodes in a multi-node database system can be allocated to running a particular database server's software. Each combination of the software and allocation of resources from a node is a server that is referred to herein as a "server instance" or "instance." A database server may comprise multiple database instances, some or all of which are running on separate computers, including separate server blades.

A database dictionary may comprise multiple data structures that store database metadata. A database dictionary may, for example, comprise multiple files and tables. Portions of the data structures may be cached in main memory of a database server.

When a database object is said to be defined by a database dictionary, the database dictionary contains metadata that defines properties of the database object. For example, metadata in a database dictionary defining a database table may specify the attribute names and data types of the attributes, and one or more files or portions thereof that store data for the table. Metadata in the database dictionary defining a procedure may specify a name of the procedure, the procedure's arguments and the return data type, and the data types of the arguments, and may include source code and a compiled version thereof.

A database object may be defined by the database dictionary, but the metadata in the database dictionary itself may only partly specify the properties of the database object. Other properties may be defined by data structures that may not be considered part of the database dictionary. For example, a user-defined function implemented in a JAVA class may be defined in part by the database dictionary by specifying the name of the user-defined function and by specifying a reference to a file containing the source code of the Java class (i.e., .java file) and the compiled version of the class (i.e., .class file).

Native data types are data types supported by a DBMS "out-of-the-box." Non-native data types, on the other hand, may not be supported by a DBMS out-of-the-box. Non-native data types include user-defined abstract types or object classes. Non-native data types are only recognized and processed in database commands by a DBMS once the non-native data types are defined in the database dictionary of the DBMS, by, for example, issuing DDL statements to the DBMS that define the non-native data types. Native data types do not have to be defined by a database dictionary to be recognized as valid data types and to be processed by a DBMS in database statements. In general, database software of a DBMS is programmed to recognize and process native data types without configuring the DBMS to do so by, for example, defining a data type by issuing DDL statements to the DBMS.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 4:
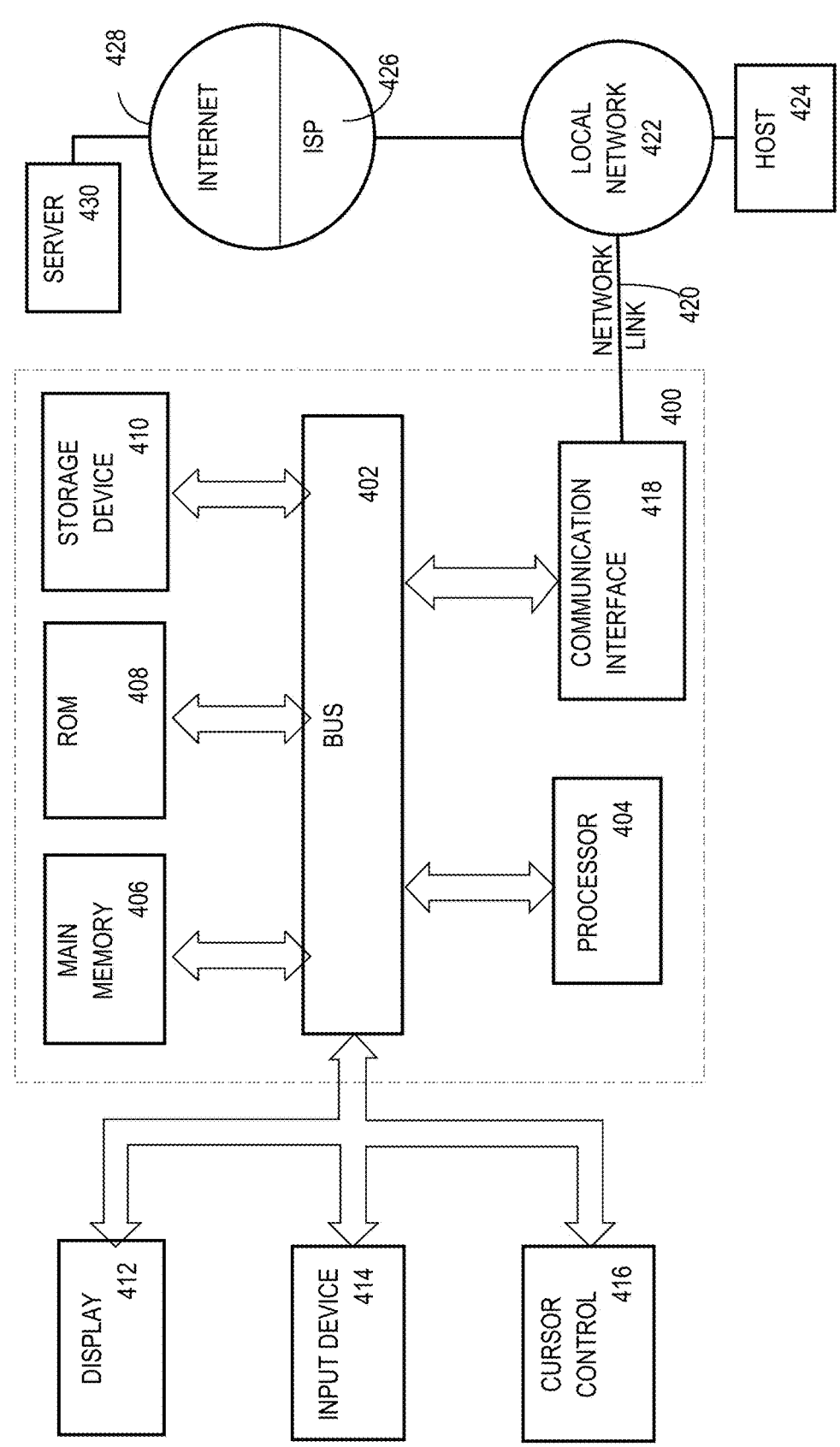
FIG. 4 is a block diagram that illustrates a computer system upon which an embodiment of the invention may be implemented.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk, optical disk, or solid-state drive is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 410. Volatile media includes dynamic memory, such as main memory 406. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid-state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

Software Overview

Figure 5:
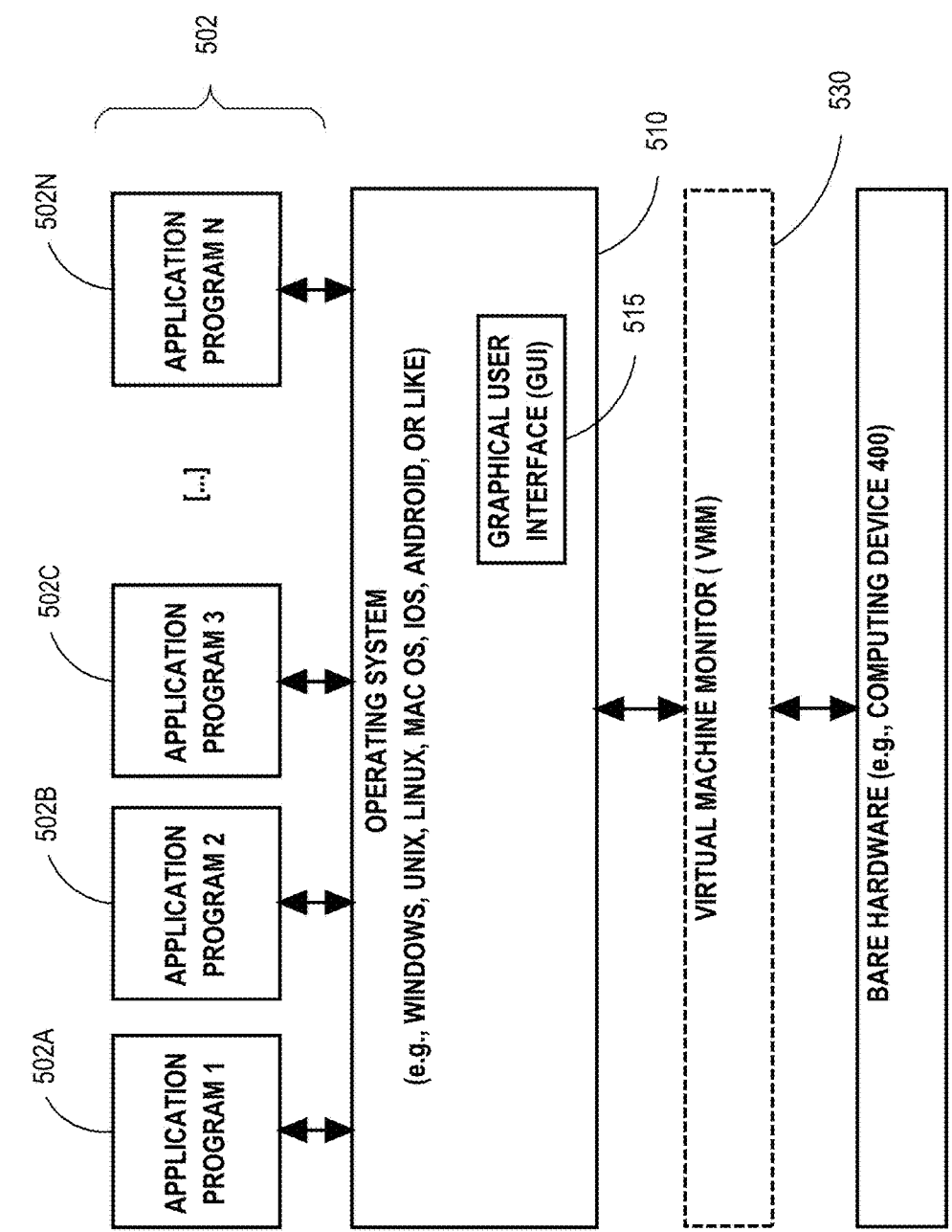
FIG. 5 is a block diagram that illustrates a basic software system that may be employed for controlling the operation of a computing system.

FIG. 5 is a block diagram of a basic software system 500 that may be employed for controlling the operation of computing system 400. Software system 500 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 500 is provided for directing the operation of computing system 400. Software system 500, which may be stored in system memory (RAM) 406 and on fixed storage (e.g., hard disk or flash memory) 410, includes a kernel or operating system (OS) 510.

The OS 510 manages low-level aspects of computer operation, including managing execution of processes, memory allocation, file input and output (I/O), and device I/O. One or more application programs, represented as 502A, 502B, 502C . . . 502N, may be "loaded" (e.g., transferred from fixed storage 410 into memory 406) for execution by the system 500. The applications or other software intended for use on computer system 400 may also be stored as a set of downloadable computer-executable instructions, for example, for downloading and installation from an Internet location (e.g., a Web server, an app store, or other online service).

Software system 500 includes a graphical user interface (GUI) 515, for receiving user commands and data in a graphical (e.g., "point-and-click" or "touch gesture") fashion. These inputs, in turn, may be acted upon by the system 500 in accordance with instructions from operating system 510 and/or application(s) 502. The GUI 515 also serves to display the results of operation from the OS 510 and application(s) 502, whereupon the user may supply additional inputs or terminate the session (e.g., log off).

OS 510 can execute directly on the bare hardware 520 (e.g., processor(s) 404) of computer system 400. Alternatively, a hypervisor or virtual machine monitor (VMM) 530 may be interposed between the bare hardware 520 and the OS 510. In this configuration, VMM 530 acts as a software "cushion" or virtualization layer between the OS 510 and the bare hardware 520 of the computer system 400.

VMM 530 instantiates and runs one or more virtual machine instances ("guest machines"). Each guest machine comprises a "guest" operating system, such as OS 510, and one or more applications, such as application(s) 502, designed to execute on the guest operating system. The VMM 530 presents the guest operating systems with a virtual operating platform and manages the execution of the guest operating systems.

In some instances, the VMM 530 may allow a guest operating system to run as if it is running on the bare hardware 520 of computer system 400 directly. In these instances, the same version of the guest operating system configured to execute on the bare hardware 520 directly may also execute on VMM 530 without modification or reconfiguration. In other words, VMM 530 may provide full hardware and CPU virtualization to a guest operating system in some instances.

In other instances, a guest operating system may be specially designed or configured to execute on VMM 530 for efficiency. In these instances, the guest operating system is "aware" that it executes on a virtual machine monitor. In other words, VMM 530 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g. content of registers) between allotments of the hardware processor time when the computer system process is not running. Computer system processes run under the control of an operating system, and may run under the control of other programs being executed on the computer system.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprise two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure and applications.

The above-described basic computer hardware and software and cloud computing environment presented for purpose of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

Machine Learning Models

A machine learning model is trained using a particular machine learning algorithm. Once trained, input is applied to the machine learning model to make a prediction, which may also be referred to herein as a predicated output or output. Attributes of the input may be referred to as features and the values of the features may be referred to herein as feature values.

A machine learning model includes a model data representation or model artifact. A model artifact comprises parameters values, which may be referred to herein as theta values, and which are applied by a machine learning algorithm to the input to generate a predicted output. Training a machine learning model entails determining the theta values of the model artifact. The structure and organization of the theta values depends on the machine learning algorithm.

In supervised training, training data is used by a supervised training algorithm to train a machine learning model. The training data includes input and a "known" output. In an embodiment, the supervised training algorithm is an iterative procedure. In each iteration, the machine learning algorithm applies the model artifact and the input to generate a predicated output. An error or variance between the predicated output and the known output is calculated using an objective function. In effect, the output of the objective function indicates the accuracy of the machine learning model based on the particular state of the model artifact in the iteration. By applying an optimization algorithm based on the objective function, the theta values of the model artifact are adjusted. An example of an optimization algorithm is gradient descent. The iterations may be repeated until a desired accuracy is achieved or some other criteria is met.

In a software implementation, when a machine learning model is referred to as receiving an input, being executed, and/or generating an output or predication, a computer system process executing a machine learning algorithm applies the model artifact against the input to generate a predicted output. A computer system process executes a machine learning algorithm by executing software configured to cause execution of the algorithm. When a machine learning model is referred to as performing an action, a computer system process executes a machine learning algorithm by executing software configured to cause performance of the action.

Inferencing entails a computer applying the machine learning model to an input such as a feature vector to generate an inference by processing the input and content of the machine learning model in an integrated way. Inferencing is data driven according to data, such as learned coefficients, that the machine learning model contains. Herein, this is referred to as inferencing by the machine learning model that, in practice, is execution by a computer of a machine learning algorithm that processes the machine learning model.

Classes of problems that machine learning (ML) excels at include clustering, classification, regression, anomaly detection, prediction, and dimensionality reduction (i.e. simplification). Examples of machine learning algorithms include decision trees, support vector machines (SVM), Bayesian networks, stochastic algorithms such as genetic algorithms (GA), and connectionist topologies such as artificial neural networks (ANN). Implementations of machine learning may rely on matrices, symbolic models, and hierarchical and/or associative data structures. Parameterized (i.e. configurable) implementations of best of breed machine learning algorithms may be found in open source libraries such as Google's TensorFlow for Python and C++ or Georgia Institute of Technology's MLPack for C++. Shogun is an open source C++ ML library with adapters for several programing languages including C#, Ruby, Lua, Java, MatLab, R, and Python.

Artificial Neural Networks

An artificial neural network (ANN) is a machine learning model that at a high level models a system of neurons interconnected by directed edges. An overview of neural networks is described within the context of a layered feedforward neural network. Other types of neural networks share characteristics of neural networks described below.

In a layered feed forward network, such as a multilayer perceptron (MLP), each layer comprises a group of neurons.

A layered neural network comprises an input layer, an output layer, and one or more intermediate layers referred to hidden layers.

Neurons in the input layer and output layer are referred to as input neurons and output neurons, respectively. A neuron in a hidden layer or output layer may be referred to herein as an activation neuron. An activation neuron is associated with an activation function. The input layer does not contain any activation neuron.

From each neuron in the input layer and a hidden layer, there may be one or more directed edges to an activation neuron in the subsequent hidden layer or output layer. Each edge is associated with a weight. An edge from a neuron to an activation neuron represents input from the neuron to the activation neuron, as adjusted by the weight.

For a given input to a neural network, each neuron in the neural network has an activation value. For an input neuron, the activation value is simply an input value for the input. For an activation neuron, the activation value is the output of the respective activation function of the activation neuron.

Each edge from a particular neuron to an activation neuron represents that the activation value of the particular neuron is an input to the activation neuron, that is, an input to the activation function of the activation neuron, as adjusted by the weight of the edge. Thus, an activation neuron in the subsequent layer represents that the particular neuron's activation value is an input to the activation neuron's activation function, as adjusted by the weight of the edge. An activation neuron can have multiple edges directed to the activation neuron, each edge representing that the activation value from the originating neuron, as adjusted by the weight of the edge, is an input to the activation function of the activation neuron.

Each activation neuron is associated with a bias. To generate the activation value of an activation neuron, the activation function of the neuron is applied to the weighted activation values and the bias.

Illustrative Data Structures for Neural Network

The artifact of a neural network may comprise matrices of weights and biases. Training a neural network may iteratively adjust the matrices of weights and biases.

For a layered feedforward network, as well as other types of neural networks, the artifact may comprise one or more matrices of edges W. A matrix W represents edges from a layer $L-1$ to a layer $L$. Given the number of neurons in layer $L-1$ and L is $N[L-1]$ and $N[L]$, respectively, the dimensions of matrix W is $N[L-1]$ columns and $N[L]$ rows.

Biases for a particular layer L may also be stored in matrix B having one column with $N[L]$ rows.

The matrices W and B may be stored as a vector or an array in RAM memory, or comma separated set of values in memory. When an artifact is persisted in persistent storage, the matrices W and B may be stored as comma separated values, in compressed and/serialized form, or other suitable persistent form.

A particular input applied to a neural network comprises a value for each input neuron. The particular input may be stored as vector. Training data comprises multiple inputs, each being referred to as sample in a set of samples. Each sample includes a value for each input neuron. A sample may be stored as a vector of input values, while multiple samples may be stored as a matrix, each row in the matrix being a sample.

When an input is applied to a neural network, activation values are generated for the hidden layers and output layer. For each layer, the activation values for may be stored in one column of a matrix A having a row for every neuron in the layer. In a vectorized approach for training, activation values may be stored in a matrix, having a column for every sample in the training data.

Training a neural network requires storing and processing additional matrices. Optimization algorithms generate matrices of derivative values which are used to adjust matrices of weights W and biases B. Generating derivative values may use and require storing matrices of intermediate values generated when computing activation values for each layer.

The number of neurons and/or edges determines the size of matrices needed to implement a neural network. The smaller the number of neurons and edges in a neural network, the smaller matrices and amount of memory needed to store matrices. In addition, a smaller number of neurons and edges reduces the amount of computation needed to apply or train a neural network. Less neurons means less activation values need be computed, and/or less derivative values need be computed during training.

Properties of matrices used to implement a neural network correspond neurons and edges. A cell in a matrix W represents a particular edge from a neuron in layer L−1 to L. An activation neuron represents an activation function for the layer that includes the activation function. An activation neuron in layer L corresponds to a row of weights in a matrix W for the edges between layer L and L−1 and a column of weights in matrix W for edges between layer L and L+1. During execution of a neural network, a neuron also corresponds to one or more activation values stored in matrix A for the layer and generated by an activation function.

An ANN is amenable to vectorization for data parallelism, which may exploit vector hardware such as single instruction multiple data (SIMD), such as with a graphical processing unit (GPU). Matrix partitioning may achieve horizontal scaling such as with symmetric multiprocessing (SMP) such as with a multicore central processing unit (CPU) and or multiple coprocessors such as GPUs. Feed forward computation within an ANN may occur with one step per neural layer. Activation values in one layer are calculated based on weighted propagations of activation values of the previous layer, such that values are calculated for each subsequent layer in sequence, such as with respective iterations of a for loop. Layering imposes sequencing of calculations that is not parallelizable. Thus, network depth (i.e. amount of layers) may cause computational latency. Deep learning entails endowing a multilayer perceptron (MLP) with many layers. Each layer achieves data abstraction, with complicated (i.e. multidimensional as with several inputs) abstractions needing multiple layers that achieve cascaded processing. Reusable matrix based implementations of an ANN and matrix operations for feed forward processing are readily available and parallelizable in neural network libraries such as Google's TensorFlow for Python and C++, OpenNN for C++, and University of Copenhagen's fast artificial neural network (FANN). These libraries also provide model training algorithms such as backpropagation.

Backpropagation

An ANN's output may be more or less correct. For example, an ANN that recognizes letters may mistake an I as an L because those letters have similar features. Correct output may have particular value(s), while actual output may have somewhat different values. The arithmetic or geometric difference between correct and actual outputs may be measured as error according to a loss function, such that zero represents error free (i.e. completely accurate) behavior. For any edge in any layer, the difference between correct and actual outputs is a delta value.

Backpropagation entails distributing the error backward through the layers of the ANN in varying amounts to all of the connection edges within the ANN. Propagation of error causes adjustments to edge weights, which depends on the gradient of the error at each edge. Gradient of an edge is calculated by multiplying the edge's error delta times the activation value of the upstream neuron. When the gradient is negative, the greater the magnitude of error contributed to the network by an edge, the more the edge's weight should be reduced, which is negative reinforcement. When the gradient is positive, then positive reinforcement entails increasing the weight of an edge whose activation reduced the error. An edge weight is adjusted according to a percentage of the edge's gradient. The steeper is the gradient, the bigger is adjustment. Not all edge weights are adjusted by a same amount. As model training continues with additional input samples, the error of the ANN should decline. Training may cease when the error stabilizes (i.e. ceases to reduce) or vanishes beneath a threshold (i.e. approaches zero). Example mathematical formulae and techniques for feedforward multilayer perceptron (MLP), including matrix operations and backpropagation, are taught in related reference "EXACT CALCULATION OF THE HESSIAN MATRIX FOR THE MULTI-LAYER PERCEPTRON," by Christopher M. Bishop.

Model training may be supervised or unsupervised. For supervised training, the desired (i.e. correct) output is already known for each example in a training set. The training set is configured in advance by (e.g. a human expert) assigning a categorization label to each example. For example, the training set for optical character recognition may have blurry photographs of individual letters, and an expert may label each photo in advance according to which letter is shown. Error calculation and backpropagation occurs as explained above.

Autoencoder

Unsupervised model training is more involved because desired outputs need to be discovered during training. Unsupervised training may be easier to adopt because a human expert is not needed to label training examples in advance. Thus, unsupervised training saves human labor. A natural way to achieve unsupervised training is with an autoencoder, which is a kind of ANN. An autoencoder functions as an encoder/decoder (codec) that has two sets of layers. The first set of layers encodes an input example into a condensed code that needs to be learned during model training. The second set of layers decodes the condensed code to regenerate the original input example. Both sets of layers are trained together as one combined ANN. Error is defined as the difference between the original input and the regenerated input as decoded. After sufficient training, the decoder outputs more or less exactly whatever is the original input.

An autoencoder relies on the condensed code as an intermediate format for each input example. It may be counter-intuitive that the intermediate condensed codes do not initially exist and instead emerge only through model training. Unsupervised training may achieve a vocabulary of intermediate encodings based on features and distinctions of unexpected relevance. For example, which examples and which labels are used during supervised training may depend on somewhat unscientific (e.g. anecdotal) or otherwise incomplete understanding of a problem space by a human expert. Whereas, unsupervised training discovers an apt intermediate vocabulary based more or less entirely on statistical tendencies that reliably converge upon optimality with sufficient training due to the internal feedback by regenerated decodings. Techniques for unsupervised training of an autoencoder for anomaly detection based on reconstruction error is taught in non-patent literature (NPL) "VARIATIONAL AUTOENCODER BASED ANOMALY DETECTION USING RECONSTRUCTION PROBABILITY", Special Lecture on IE. 2015 Dec. 27; 2 (1): 1-18 by Jinwon An et al.

Principal Component Analysis

Principal component analysis (PCA) provides dimensionality reduction by leveraging and organizing mathematical correlation techniques such as normalization, covariance, eigenvectors, and eigenvalues. PCA incorporates aspects of feature selection by eliminating redundant features. PCA can be used for prediction. PCA can be used in conjunction with other ML algorithms.

Random Forest

A random forest or random decision forest is an ensemble of learning approaches that construct a collection of randomly generated nodes and decision trees during a training phase. Different decision trees of a forest are constructed to be each randomly restricted to only particular subsets of feature dimensions of the data set, such as with feature bootstrap aggregating (bagging). Therefore, the decision trees gain accuracy as the decision trees grow without being forced to over fit training data as would happen if the decision trees were forced to learn all feature dimensions of the data set. A prediction may be calculated based on a mean (or other integration such as soft max) of the predictions from the different decision trees.

Random forest hyper-parameters may include: number-of-trees-in-the-forest, maximum-number-of-features-considered-for-splitting-a-node, number-of-levels-in-each-decision-tree, minimum-number-of-data-points-on-a-leaf-node, method-for-sampling-data-points, etc.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
   associating a first natural language request with a correct database statement for a database schema, wherein the correct database statement contains a plurality of identifiers;
   a large language model (LLM) predicting, from the first natural language request and a strict subset of the database schema, a predicted plurality of identifiers;

backpropagating, into the LLM, a loss that is based on a comparison of: a) the plurality of identifiers in the correct database statement to b) the predicted plurality of identifiers; and
   the LLM inferentially generating, after said backpropagating, an inferred database statement from a second natural language request.

2. The method of claim 1 wherein:
   the database schema contains a plurality of database column definitions;
   the method further comprises for each column definition of the plurality of database column definitions:
      generating a fixed-size encoding of the column definition; and
      storing, in a vector store, the column definition and the fixed-size encoding of the column definition.

3. The method of claim 2 wherein the column definition comprises at least one selected from a group consisting of: a datatype name, a database constraint, and a natural language comment.

4. The method of claim 3 further comprising inferentially generating the natural language comment.

5. The method of claim 2 wherein:
   the method further comprises the vector store selecting, based on a fixed-size encoding of the first natural language request, k nearest neighboring column definitions; and
   said strict subset of the database schema is said k nearest neighboring column definitions; and
   the method further comprises the LLM accepting a linguistic prompt that contains the k nearest neighboring column definitions.

6. The method of claim 5 wherein:
   said vector store is a first vector store; and
   the method further comprises:
      populating the first vector store with database column definitions from multiple database schemas;
      finetuning the LLM by performing said selecting and said backpropagating;
      populating, after said finetuning, a second vector store with database column definitions only from a new database schema that is not in said multiple database schemas;
      the second vector store selecting a database column definition; and
      the LLM accepting a linguistic prompt that contains the second natural language request and the database column definition.

7. The method of claim 1 further comprising the LLM accepting a linguistic prompt that contains a warning that characterizes the inferred database statement.

8. The method of claim 7 wherein:
   the database schema defines a plurality of relationships between database tables; and
   the warning is a join warning that contains names of two database columns that do not correspond to a relationship in the plurality of relationships.

9. The method of claim 7 wherein the warning is selected from a group consisting of:
   an ambiguity warning that contains a name a database column that does not have a unique constraint and a mutual exclusion warning that contains a name of a database column that is used in a conjunctive predicate in the inferred database statement that cannot evaluate to true.

10. The method of claim 1 wherein said comparison is a cross entropy.

11. The method of claim 10 further comprising:

first lexical sorting the plurality of identifiers in the correct database statement;

second lexical sorting the predicted plurality of identifiers; and based on said first lexical sorting and said second lexical sorting, measuring said cross entropy.

12. The method of claim 10 wherein said loss is based on said cross entropy and a second cross entropy.

13. The method of claim 1 further comprising the LLM inferentially generating a second inferred database statement from the database schema and the first natural language request.

14. The method of claim 13 wherein said loss is further based on a second comparison of said inferred database statement to the second inferred database statement.

15. The method of claim 14 wherein said second comparison is a cross entropy between two sequences of lexical tokens.

16. The method of claim 1 wherein:

the first natural language request is a question; and the second natural language request is not a question.

17. The method of claim 1 further comprising from a plurality of leaves of a parse tree of the correct database statement, determining said plurality of identifiers.

18. The method of claim 1 wherein the plurality of identifiers includes an identifier that contains a name of a database table and a name of a table column.

19. The method of claim 1 wherein the plurality of identifiers includes a name of a primary key or a name of a foreign key.

20. The method of claim 1 further comprising performing low rank adaptation (LoRA) that performs said backpropagating.

21. One or more computer-readable non-transitory media storing instructions that, when executed by one or more processors, cause:

associating a first natural language request with a correct database statement for a database schema, wherein the correct database statement contains a plurality of identifiers;

a large language model (LLM) predicting, from the first natural language request and a strict subset of the database schema, a predicted plurality of identifiers;

backpropagating, into the LLM, a loss that is based on a comparison of: a) the plurality of identifiers in the correct database statement to b) the predicted plurality of identifiers; and the LLM inferentially generating, after said backpropagating, an inferred database statement from a second natural language request.

22. The one or more computer-readable non-transitory media of claim 21 wherein:

the database schema contains a plurality of database column definitions; and the instructions further cause for each column definition of the plurality of database column definitions:

generating a fixed-size encoding of the column definition; and storing, in a vector store, the column definition and the fixed-size encoding of the column definition.

23. The one or more computer-readable non-transitory media of claim 21 wherein the instructions further cause the LLM accepting a linguistic prompt that contains a warning that characterizes the inferred database statement.

24. The one or more computer-readable non-transitory media of claim 21 wherein said comparison is a cross entropy.

25. The one or more computer-readable non-transitory media of claim 21 wherein the instructions further cause the LLM inferentially generating a second inferred database statement from the database schema and the first natural language request.

* * * * *